July 4, 1950  A. W. HAYDON  2,513,410
ELECTRIC MOTOR
Filed Aug. 18, 1944  3 Sheets-Sheet 2
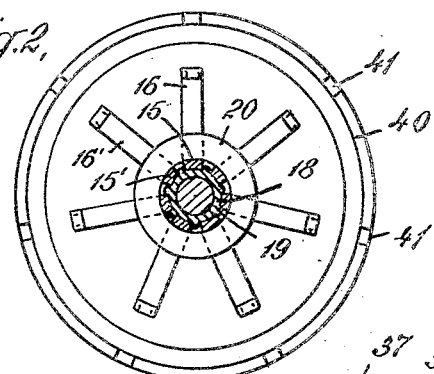
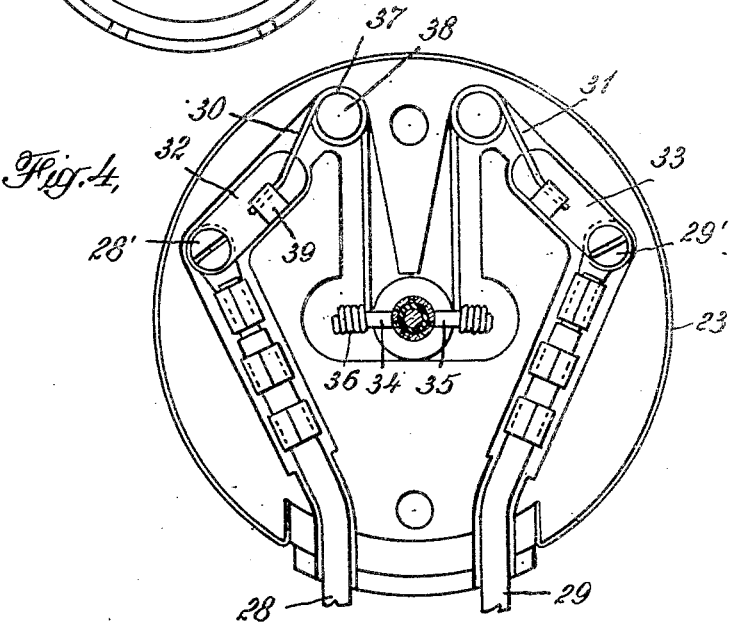
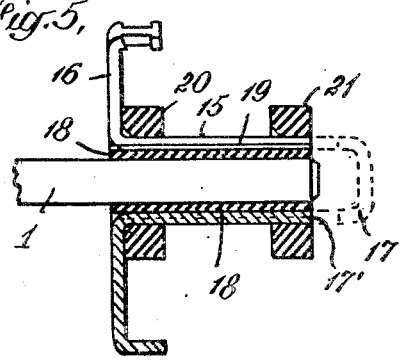
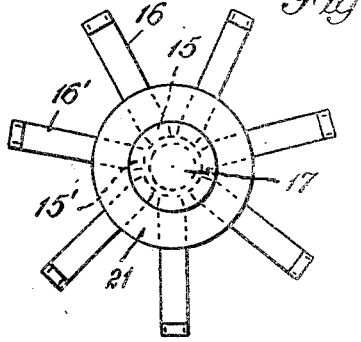
INVENTOR
A. W. Haydon
BY
ATTORNEYS July 4, 1950      A. W. HAYDON      2,513,410
ELECTRIC MOTOR
Filed Aug. 18, 1944      3 Sheets-Sheet 3
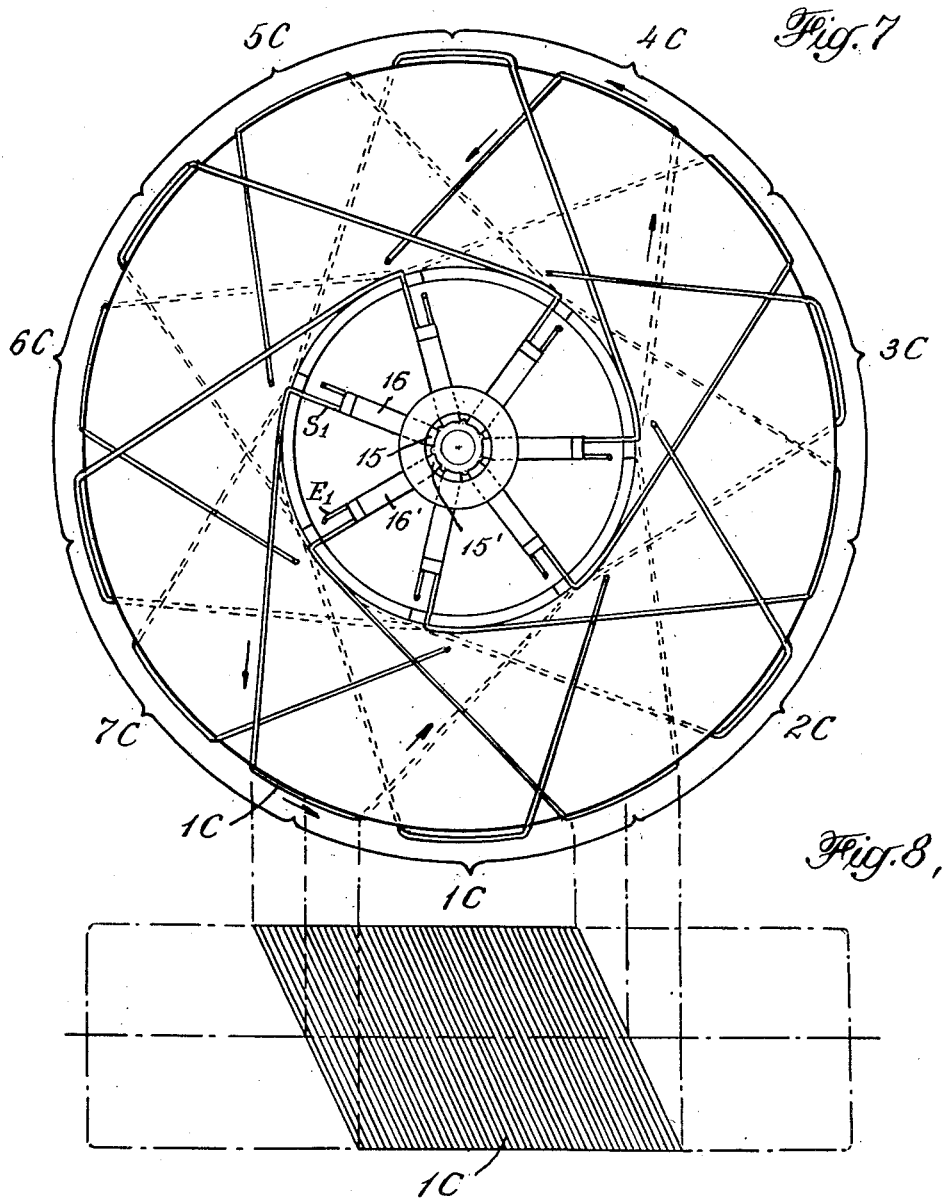
INVENTOR
A. W. Haydon
BY
ATTORNEYS Patented July 4, 1950

2,513,410

UNITED STATES PATENT OFFICE 2,513,410

ELECTRIC MOTOR

Arthur William Haydon, Marion, Conn.

Application August 18, 1944, Serial No. 549,997

10 Claims. (Cl. 171—252)

This invention relates to electrical apparatus, and, more particularly, to dynamoelectric devices of the type especially suitable for use as a direct current motor or generator, but also suitable for other uses.

In general, it has been the practice heretofore in manufacturing dynamoelectric devices of the type having a stationary element or stator associated with a rotor having a plurality of conductors, to make the rotor in such a manner that it comprises magnetizable material with a winding of some form fixed with respect to the body of magnetic material, so that the magnetic body and the winding rotate as a unit with respect to the stator structure. I have found that a device of this general character, but having greatly improved qualities and characteristics, can be provided by forming the rotating element in a manner such that it does not include magnetizable material, this element being associated with one or more stationary elements constituting a substantial portion of the magnetic circuit for the device.

According to one embodiment of my invention, I provide a wound rotor consisting of material that is not magnetizable and a stationary element adapted to provide a magnetic field in the path of the rotor winding. The desired magnetic field is preferably provided by magnetizable material, at least a portion of which is disposed within the rotor winding, but spaced therefrom by a suitable air gap, and so mounted that it does not rotate with the rotor winding. The desired magnetic field may be provided by a permanent magnet or by a body of magnetizable material magnetized by a suitable winding or coil.

My invention also contemplates the use of a wound rotor of a non-magnetizable material and stationary bodies of magnetizable material, at least one of which is mounted inside the rotor winding with another mounted outside the rotor winding so that the rotor winding may follow a path between these two bodies to provide motor action or generator action as desired.

Referring particularly to my improved rotor construction, it may be said to consist essentially of a winding including a series of coils connected to commutator bars, these coils having conducting portions adapted to traverse a magnetic field provided by one or more stationary magnetizable elements.

According to one embodiment of my invention, the rotor winding may be mounted on, or otherwise associated with, a conducting element of aluminum or other non-magnetizable material, which may provide a desirable stabilizing eddy current effect, thereby preventing erratic performance of the device.

My invention embraces not only an improved dynamoelectric device but it also includes novel elements and improved methods of making such elements. Thus, I have provided a novel method of winding rotor coils whereby many turns of fine wire may be disposed in such a manner that the inductor portions thereof traversing the magnetic field comprise a very thin layer, thereby reducing the field air gap and providing efficient operation without the necessity of employing any iron or other magnetizable material in the rotating element, the rotor field being preferably formed so that the stationary magnetizable body may be mounted within the rotor winding and extend into close proximity to the inductor portions of the rotor coils.

I have also provided an improved method of forming a commutator for devices employing a wound rotor of small dimensions. In general, I prefer to form the commutator by employing a single piece of metal which is shaped so that ultimately it provides individual commutator segments and commutator end connections for engaging the rotor coil ends, the method involving the formation of this commutator structure and its assembly as an integral unit, whereupon a portion of the material is severed to thereby provide the desired commutator structure having commutator segments spaced from each other.

One of the outstanding advantages of my improved construction is that portions of the magnetic circuit which include magnetizable material may remain stationary at all times so that there is no need for any reversal of magnetism in any portion of the magnetizable material. This makes it unnecessary to employ the usual laminated structure which is ordinarily necessary for the purpose of reducing iron losses. A further advantage of my invention is the fact that a body of magnetizable material located within the rotor winding may be used for the purpose of generating the required magnetic field, whereas in the usual type of rotor containing iron, or the like, rotating with the rotor winding, this magnetizable material cannot be used for this purpose because of the fact that it is rotating with the rotor winding. In general, it may be said that the preferred embodiment of my invention employs a wound rotor associated with magnetizable material, not in the usual manner whereby both of these elements rotate together, but in a novel manner whereby the magnetizable material remains stationary and only the winding and any non-magnetizable element, or elements, fixed with respect thereto rotate in the magnetic field. The magnetic field provided in the path of the rotor winding may be generated in a variety of ways, but preferably by a magnetizable body within the rotor winding, and I also prefer to employ an additional magnetizable body outside the rotor winding to insure an efficient return path for the magnetic field.

The rotor winding may be made self supporting by mounting it on any desired structure of non-magnetizable material, or it may be self supporting solely by virtue of its own inherent rigidity, due to the qualities of the metal in the winding itself and the form of the winding which may comprise a series of overlapped single layer coils, each of many turns, progressively arranged to form a series of inductors adapted to traverse the magnetic field in the path of this wound rotor winding.

Another feature of my invention is an improved commutator brush holder construction of such a nature that the brushes are firmly held in resilient contact with the commutator at all times, even though the commutator is of very small diameter. This brush holder construction is such that it occupies a minimum of space. In general, I prefer to employ resilient wire which serves as a conductor for the electric current supplied to the brushes, or collected from the brushes, as the case may be, and this wire is so formed that at one extremity of each brush holder, the brush is supported firmly by a coiled section of the wire, and another portion of the wire extends around a stationary post and then to an abutment which maintains the resilient wire support under tension.

The various objects and advantages of my invention will be explained in greater detail in conjunction with certain embodiments of my invention illustrated in the accompanying drawings, in which Fig. 1 is a vertical section view of a direct current motor embodying my invention;

Fig. 2 is a section view of a portion of the motor illustrated in Fig. 1, taken on line 2—2 of Fig. 1;

Fig. 3 is an end view of an insulating element adjacent the commutator of the motor;

Fig. 4 is a rear elevation of the motor of Fig. 1 with the rear cover removed;

Fig. 5 is an enlarged section view of the commutator structure illustrating its method of manufacture;

Fig. 6 is an end view of the elements illustrated in Fig. 5;

Fig. 7 is an end elevation of the rotor forming a part of the motor of Fig. 1, illustrating the first turn of each coil of the rotor winding; and Fig. 8 is a partial development of one coil of the rotor winding showing that portion thereof extending across the face of the rotor, parallel to the rotor shaft.

Figure 1:
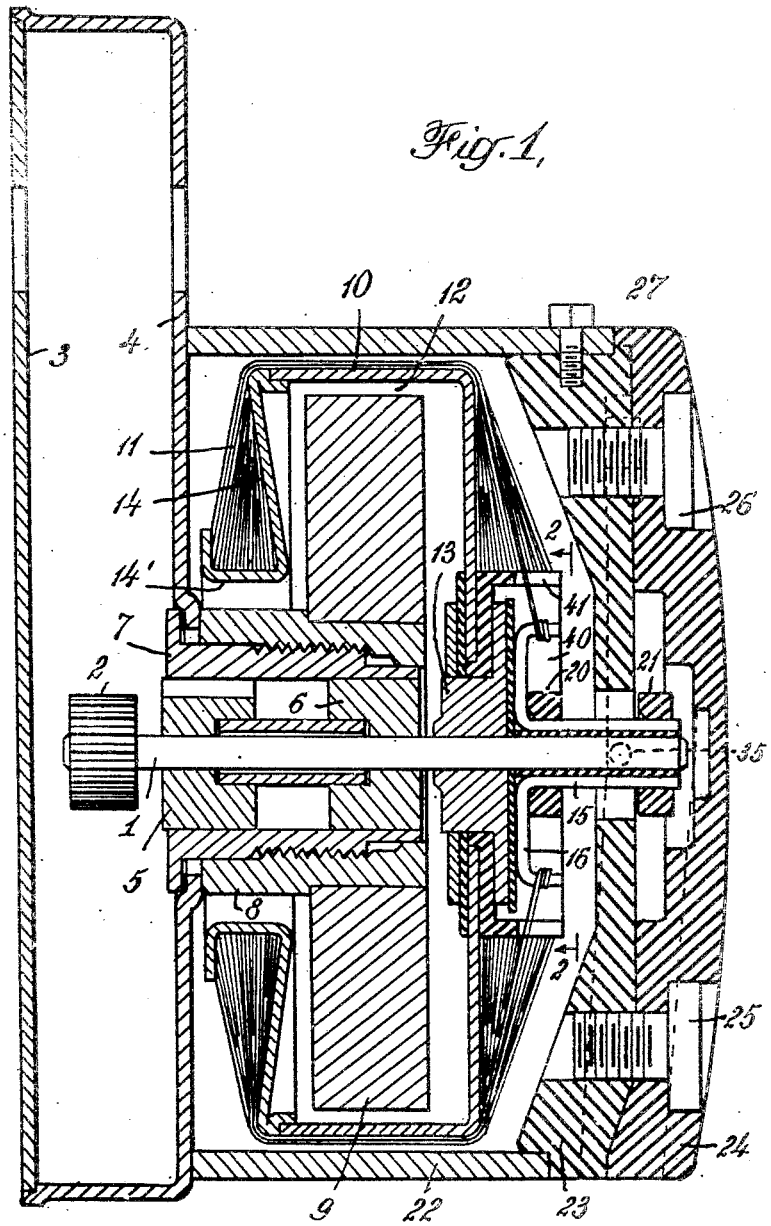

The illustrative embodiment of my invention shown in the accompanying drawings comprises a direct current motor, a portion of which is integral with an adjacent section of a gear housing. Referring particularly to Fig. 1, this motor structure includes a rotor shaft 1 having a driving pinion 2 thereon located in a gear housing represented by the elements 3 and 4. The arrangement of the gears in this housing driven by the motor pinion 2, forms no part of this invention, and accordingly they have not been illustrated. The rotor shaft 1 is mounted in bearings 5 and 6 carried by a screw threaded plug 7. This plug 7 engages a threaded opening in a sleeve 8 which is clamped against the face of the gear housing plate 4 when the plug 7 is screwed into the opening in this sleeve. The sleeve 8 has fixed thereto a body of magnetizable metal 9 which may be in the form of an annular disk, or any other desired shape, and this body 9 extends into close proximity to a cup-shaped member 10 which forms a support for the rotor winding 11.

It will be noted that the body 9 of magnetizable material fixed to the sleeve 8 is mounted in a stationary position with respect to the gear housing plate 4. The body 9 is a permanent magnet made of any material suitable for such purpose, and although it is located entirely within the rotor winding 11, it may serve the useful purpose of providing a magnetic field in the path of the rotor inductors, the body 9 being separated from the rotor winding support by a narrow air gap, as shown at 12.

The rotor of my improved motor comprises a supporting member 13 fixed to the rotor shaft 1 and carrying the coil support 10 which may be made of aluminum or any other non-magnetizable metal which may serve the useful purpose of generating eddy currents to stabilize the motor operation. It will be understood, however, that this support may be made of any desired material other than magnetizable materials, and, as an example, it may be made of insulating material, or it may be omitted entirely if an extremely light rotor is desired, in which event the rotor winding 11 is entirely self supporting by virtue of its shape and the rigidity of the wire of which it is made. Where a support for the rotor winding is employed, such as that illustrated at 10, it is frequently desirable to use an end plate 14 for this cup-shaped support to aid in supporting the adjacent end portion of the rotor winding, particularly during the process of forming this winding.

A feature of my invention is the manner in which the rotor winding is formed, and in order to explain this feature, reference will be made particularly to Figs. 7 and 8. In Fig. 7, which shows an end view of the motor commutator with the commutator segments connected to their respective rotor coils, it will be noted that in this illustrative embodiment of the invention there are seven commutator segments and seven coils connected therewith. In Fig. 7 a commutator segment 15 having a radially extending end connection 16 is shown connected to terminal $S_1$ of coil IC, and the other terminal $E_1$ of coil IC is connected to the commutator end connection 16' of the adjacent commutator segment 15'. The intermediate convolutions of this coil IC are progressively wound around the structure, as illustrated by the end connections of Fig. 7 and the partial development of coil IC in Fig. 8, the coil winding being such that the portions thereof at the periphery of the rotor form a thin band representing a series of inductors in close proximity to the magnetic body 9 mounted in a stationary position within the rotor, as best illustrated in Fig. 1. The location of the other coils of the wound rotor is designated by the reference characters 2C, 3C, 4C, 5C, 6C and 7C in Fig. 7, and it will be understood that these coils are progressively distributed around the rotor to form a compact winding having the external appearance of a ball of twine wound in the usual manner with an opening through the center. In my improved motor structure, these open ends of the winding body or cylinder, serve to accommodate the commutator with its end connections at one end of the cylinder, and to receive the stationary mounting sleeve 8 at the other end of this rotor cylinder. The successive convolutions or turns of each coil are progressively wound around the rotor with each turn extending across diametrically opposed portions of the rotor. Thus the portions of each turn intermediate the end portions thereof extend across diametrically opposed portions of the rotor, as clearly shown in Fig. 7.

By referring to Fig. 1 it will be noted that the rotor winding is, in a sense, formed around the magnet body 9, and it will be understood that in making the rotor I prefer to mount the body 9 and its supporting sleeve 8 on a suitable fixture which may also support the cup-shaped element 10, if desired, and the coils are then formed around the support 10. As explained above, an end plate 14 may be used for supporting one end of the winding as it is being formed, this plate having an annular center portion 14' for guiding the coil end connections around the space occupied by the sleeve 8 which supports the magnet body 9. In the event an end plate such as that illustrated at 14 is not employed, the magnet body 9 may be held in such a position during the winding operation as to facilitate the formation of the end portion of the winding adjacent the sleeve 8. The rotor winding is preferably made of fine wire coated with an insulating material.

A typical method of forming the commutator according to my invention can best be explained by reference to Figs. 2, 3, 5 and 6. A piece of metal suitable for making commutator segments is first formed so as to have a center portion, shown in dotted lines at 17 in Fig. 5, and a plurality of arms extending outward from this center portion 17 and adapted to be bent toward each other to form a series of commutator segments like those illustrated at 15 and 15', with the extremities bent to form connecting pieces like those illustrated at 16 and 16'. This unitary commutator body is then slipped over an insulating sleeve 18 which may be provided with ribs 19 separating adjacent commutator segments, as best illustrated in Figs. 2 and 3. The several metal arms that are to form the commutator segments are then firmly secured to the insulating sleeve 18 as by forcing over these elements a pair of washers 20 and 21 which are preferably made of hard fiber or other insulating material. The center portion 17 of the metal piece may then be severed, as illustrated at 17', because the arms now forming the commutator segments are firmly held in place by the washers 20 and 21. The ribs 19 on the insulating sleeve 18 may be omitted if desired, in which event a coating of insulating varnish or similar material applied to the commutator segments fills the spaces between these segments to thereby insulate the segments from each other. My improved method of making commutators is of great value, especially where the commutator is of small dimensions, for according to my invention a commutator of very small diameter can be made without handling a large number of separate pieces that are to form the commutator bars or segments. As previously explained, my improved method makes it possible to have these commutator elements all part of a single piece of metal which can be handled as a unit until the assembly operation is completed. By referring to Fig. 1, it will be noted that the extremities of the rotor coils are attached to the commutator segment connecting pieces such as those illustrated at 16 and 16', the coil ends extending through notches 41 in an insulating cup-shaped member 40 mounted on the rotor shaft.

The magnetic circuit for the motor comprises the stationary magnet body 9 within the rotor, the adjacent portion of the gear housing plate 4 and a cylindrical housing 22 of magnetizable material which may be welded or otherwise firmly secured to the gear housing plate 4. The cylinder 22 encloses the rotor, and at one end of this cylinder I have provided two disks of insulating material 23 and 24. The disk 24 is secured to the disk 23 in any suitable manner, as by means of the screws 25 and 26, and serves as a cover for the motor assembly. The inner disk 23 may be secured to the cylinder 22 by a series of screws 27 or the like. As illustrated in Fig. 4, the insulating disk 23 may be provided with grooves, or depressions, to accommodate the lead wires 28 and 29, the extremities of which are shown fixed to the insulating disk 23 by screws 28' and 29'. The grooves or channels in the disk 23 also accommodate commutator brush holders 30 and 31 and contact pieces 32 and 33 connected to the lead terminals. The brushes 34 and 35 of carbon or the like, are held in resilient engagement with the commutator by means of the brush holders 30 and 31. The brush holder 30 is in the form of a resilient wire having a coiled portion 36 for holding the brush 34, and this wire is provided with a second coiled portion 37 for engaging a stationary post 38 forming a part of the insulating disk 23. One extremity of the brush holder 30 engages a lug 39 carried by the contact piece 32, and the brush holder is thereby maintained under tension so that the brush is resiliently held against the commutator. In general, the two brush holders 30 and 31 are of the same construction, each comprising what may be characterized as a V-shaped piece of resilient wire having two coiled portions for holding the brush and engaging the post 38 and with one end secured to the corresponding contact piece associated with one of the lead wires supplying current to the motor.

In general it will be understood that my invention includes an improved dynamo electric device useful as a motor, as a generator or for other purposes such as meters or the like; and it includes not only a device of this character of improved construction and operation, but also improved methods of manufacturing devices of this character. Thus my improved method of making commutators greatly simplifies the operation of assembling the elements necessary to form the required series of commutator bars, and this method is of particular value in making very small commutators. In general it is desirable to have a small commutator in order to provide a low surface speed, reduced wear on the commutator brushes, and reduced drag on the rotor due to the fact that the brush friction is reduced to a minimum. The rotor can be made entirely of material that is non-magnetizable, and the absence of iron or the like makes it possible to provide a non-inductive rotor circuit that reduces commutator arcing, thus contributing to brush life as well as minimizing radio interference. By mounting the field magnet in a stationary position inside the rotor, an efficient device of very small dimensions can be made, and the iron instead of rotating as in an ordinary motor, remains stationary and is thereby available for the purpose of producing the required magnetic field. My improved method of making the rotor winding allows for adequate access to the space within the rotor, thereby facilitating the mounting of the stationary field magnet within the rotor, providing space for supporting the rotor bearings with ample lubrication space adjacent the rotor bearing assembly. The use of an aluminum cup or a similar cup-shaped body of non-magnetizable metal for supporting the rotor winding contributes to the rigidity of the rotor structure and also provides a stabilizing effect during operation of the motor because of the eddy currents generated in this metal body. For some purposes I prefer to employ a non-metallic support for the rotor winding, and it is even feasible to employ a rotor winding having no permanent support for the winding coils other than their mutual relation to each other in coiled form, and the stiffness or rigidity provided by the coated wire of which the coils are made.

It will be understood that my invention is not limited to the particular illustrative embodiment illustrated in the accompanying drawings and described in detail, but includes such modifications thereof as fall within the scope of the appended claims.

I claim:

1. A device of the type described comprising a wound rotor consisting of material that is not magnetizable, and a stator providing a magnetic field in the path of the rotor winding, said rotor comprising a hollow cylindrical body of non-magnetizable material, and a winding comprising a plurality of coils of wire wound around said cylindrical body, the outer turns of the wires of each coil being progressively advanced peripherally from the respective preceding turns to form a thin cylindrical band of inductors at the perimeter of said cylindrical body.

2. In a dynamoelectric device a stator embodying an inner stationary magnetic body, means for supporting it at one side, and a wound rotor of generally cylindrical shape arranged to rotate about said body comprising a cylindrical part extending around the periphery of said body, an end cover therefor having an opening through which extends said supporting means, and a rotor winding having strands extending across said cylindrical part with connecting portions extending across and resting against said end cover.

3. In a small direct current motor, a hollow wound rotor and a stationary stator embodying a magnetic body mounted within said rotor, said rotor embodying a winding each outer turn of which is laid adjacent the preceding turn progressively around the periphery of the rotor to form a rotor with a relatively thin outer radial section and with each turn extending across diametrically opposed portions of the rotor.

4. In a small direct current motor, a hollow wound rotor and a stationary stator embodying a magnetic body mounted within said rotor, said rotor embodying a generally cylindrical member having a thin peripheral wall and a winding therefor comprising a series of coils each extending substantially around the cylindrical form and each of which is progressively advanced peripherally from the preceding coil the peripheral strands laying successively side by side to form a thin layer on the external surface of said member, the cross connection of each coil at one end passing to one side of the axis of the rotor and at the other end to the opposite side of the axis with the intermediate portions of each coil extending across diametrically opposed portions of the rotor.

5. A device of the type described comprising a non-magnetizable wound rotor including a series of coils, a commutator connected to said coils, said rotor coils having conducting portions arranged to traverse a magnetic field, means for producing said magnetic field comprising a stationary unwound permanent magnet disposed interiorly of said rotor, a fixed support for said body, a relatively thin outer shell located exteriorly of said rotor adapted to provide a path for magnetic lines of force emanating from said permanent magnet, and a rotary shaft for said rotor mounted within said support.

6. In a dynamoelectric device, a main supporting frame structure, an inner stationary field element having a support on said frame at one side of said element, a rotor having a wound portion adapted to rotate about the periphery of said element, a complemental field element located in fixed position exteriorly of said rotor, a rotary shaft for said rotor with the rotor secured thereon at the side of said inner field element opposite to said first-mentioned side, said shaft being supported in and extending through said support for said inner field element, and a power connection at the inner end of said shaft on the opposite side of said inner field element from said rotor support.

7. In a dynamoelectric device, a main supporting frame, an inner stationary field element, means for supporting said element on said frame at exclusively one side of said element, a rotor adapted to rotate about the periphery of said element provided with a winding having connections extending across its ends at each side of said element but provided with a central opening at the corresponding end to receive said element supporting means, and a rotary shaft for said rotor extending into and supported exclusively in said supporting means for said element, said rotor being mounted thereon at the side of said element opposite to said first-mentioned side.

8. In a dynamoelectric device, a main supporting frame, an inner stationary field element, means for supporting said element on said frame at exclusively one side of said element, a rotor adapted to rotate about the periphery of said element provided with a winding having connections extending across its ends at each side of said element but provided with a central opening at the corresponding end to receive said element supporting means, a rotary shaft for said rotor extending through and supported exclusively in said supporting means for said element, said rotor being supported on said shaft at the side of said element opposite to said first-mentioned side, and a power connection at the inner end of said shaft on the opposite side of said inner field element from said rotor support.

9. In a dynamoelectric device, a main supporting frame structure, an inner stationary field element having a support on said frame exclusively at one side of said element, a rotor of generally cylindrical shape provided with a segmental commutator and having a winding comprising a series of coils each extending substantially around the cylindrical form with connections across the ends of each side of said element, each of which coils is progressively advanced peripherally from the preceding coil, a complemental field element located in fixed position exteriorly of said rotor, and a rotary shaft for said rotor with the rotor secured thereon at the side of said inner field element opposite to said first-mentioned side, said shaft extending into and being supported exclusively in said support for said inner field element.

10. In a dynamoelectric device, a main supporting frame structure, an inner stationary unwound permanent magnet, means for supporting said inner magnet on said frame structure at exclusively one side of said magnet, a rotor having a wound portion adapted to rotate about said inner magnet, an outer stationary relatively thin shell located exteriorly of said rotor adapted to provide a path for magnetic lines emanating from said inner permanent magnet, a rotary shaft for said rotor with the rotor secured thereon exclusively at the side of said inner magnet opposite to said first-mentioned side, said shaft being supported in and extending through said support for said inner magnet, and a power connection at the inner end of said shaft on the opposite side of said magnet from the rotor connection to the shaft.

ARTHUR WILLIAM HAYDON.

REFERENCES CITED

The following references are of record in the file of this patent:

UNITED STATES PATENTS

| Number | Name | Date |
|---|---|---|
| 255,364 | Weston | Mar. 21, 1882 |
| 260,111 | McTighe | June 27, 1882 |
| 295,368 | Dennis | Mar. 18, 1884 |
| 304,145 | Sprague | Aug. 26, 1884 |
| 377,683 | Mather | Feb. 7, 1888 |
| 534,079 | Parshal | Feb. 12, 1895 |
| 1,075,502 | Scott | Oct. 14, 1913 |
| 1,552,256 | Wood | Sept. 1, 1925 |
| 1,796,556 | Boitel | Mar. 17, 1931 |
| 2,402,214 | Suydam | June 18, 1946 |